May 14, 1968 J. LÜSCHER 3,383,569

TRANSISTOR-CAPACITOR INTEGRATED CIRCUIT STRUCTURE

Filed March 23, 1965 5 Sheets-Sheet 1

TRANSISTOR-CAPACITOR INTEGRATED CIRCUIT STRUCTURE

TRANSISTOR-CAPACITOR INTEGRATED CIRCUIT STRUCTURE

Filed March 23, 1965 5 Sheets-Sheet 3

May 14, 1968 J. LÜSCHER 3,383,569

TRANSISTOR-CAPACITOR INTEGRATED CIRCUIT STRUCTURE

Filed March 23, 1965 5 Sheets-Sheet 5

United States Patent Office 3,383,569

Patented May 14, 1968

3,383,569

TRANSISTOR-CAPACITOR INTEGRATED CIRCUIT STRUCTURE

Jakob Lüscher, Geneva, Switzerland, assignor to Societe Suisse Pour l'Industrie Horlogere S.A., Geneva, Switzerland, a Swiss body corporate Filed Mar. 23, 1965, Ser. No. 441,975
Claims priority, application Switzerland, Mar. 26, 1964, 3,994/64
9 Claims. (Cl. 317—235)

ABSTRACT OF THE DISCLOSURE

The invention provides an integrated electronic circuit wherein transistors of the same conductivity type and capacitors of very small size represent ease of integration and are introduced for power consumption in the integrated circuit to be characteristically very low, at least one elementary amplifying circuit of low power consumption being among the transistors and capacitors integrated and correspondingly having one of the transistors and one of the capacitors connected in series and supplied by a periodic voltage source.

*Background of the invention*

This invention relates to integrated electronic circuits.

The integration of electronic circuits of conventional design, for example in a semi-conductive monocrystal, notably microscopic circuits of very low power consumption, is presently running up against a major stumbling block, namely that of forming resistors of high ohmic value.

To avoid this stumbling block, the circuits to be integrated should be circuits that do not include resistors. Such circuits, are, for example, those which involve the use of series-connected complementary transistors controlled by a common voltage. A circuit consisting of two series-connected complementary transistors, supplied by a direct voltage source and controlled by a common voltage, operates as follows:

If the input (control) voltage is nil in relation to the negative terminal of the supply source, then it is the transistor connected to the positive terminal of the supply source which is conductive and the output voltage is then equal to the supply voltage. If the input voltage is at least equal to the supply voltage, then it is the transistor connected to the negative terminal of the supply source which is conductive and the output voltage is then nil.

Such a basic circuit, with two series-connected complementary transistors, is thus well suited for inclusion in more complex circuits, such as for example oscillators, amplifiers, flip-flop circuits and logic circuits, that do comprise resistors. However, in order to have a low power consuming circuit, the transistors resorted to must be transistors that only require a very low control current and which, when this control current is nil, have a very low supply current flowing therethrough. These conditions are for example satisfied by an insulated gate field-effect transistor, by a planar transistor or by a TFT transistor (thin-film-transistor).

As is known, an insulated gate field-effect transistor, the principle of which has been known for a long time, comprises a source and a drain each consisting of a semi-conductive zone of one conductivity type, which zones are formed on the same side of a semi-conductive body of opposite conductivity type. The gate is separated from the two zones by an insulating layer deposited on the surface of the body lying between the two zones and on part of the latter. Depending on whether the two zones are of the P or N type, the transistor formed thereby will also be of the P or N type.

Thus, by resorting to complementary transistors, notably insulated gate field-effect transistors, it is possible to produce an electronic circuit having no resistors and consuming only very little energy. The absence of resistors, which are the major stumbling-block in circuit integration, should therefore make the latter impossible. However, another difficulty, which is inherent in the use of complementary transistors, renders the production of an integrated circuit highly delicate and complicated.

In this connection, the forming of complementary transistors in a single crystal requires a very large number of technologically highly delicate operations. Thus, for example, in order to integrate two complementary insulated gate field-effect transistors, it is necessary to form on one face of a crystal, for example, a P-type crystal, two N-type zones, to deposit near these zones an N-type monocrystalline layer doped to a well defined extent, and to form in this layer two P-type zones.

Consequently, it is necessary, in order for the integration of an electronic circuit to be made possible and relatively easy, not only for the circuit not to have resistors but also for the transistors it includes to be of the same conductivity type, i.e. for the transistors to be all either of P-type or of N-type, and this is what the invention sets out to achieve.

According to the present invention there is provided an integrated electronic circuit consisting essentially of insulated-gate field-effect transistors of the same conductivity type and of capacitors electrically connected in a predetermined circuit arrangement, each of said transistors having first and second electrodes in a conduction path, and a gate electrode for controlling the conductivity of the path, said electrodes being formed on one face of a body of semiconductive material and said first and second electrodes of the transistor having rectifying junctions with said body, and said capacitors each having first and second electrodes and a dielectric between said first and second electrodes thereof, said capacitor electrodes and dielectric also being formed on said one face of said body, there being a voltage-amplifying elementary circuit formed having therein a said transistor and a said capacitor, said transistor and said capacitor being connected in series by their first electrodes, their second electrodes being adapted to be connected to the terminals of a periodic supply voltage source, said gate electrode and second electrode of said transistor providing the input of said voltage-amplifying elementary circuit and being adapted to be connected to the terminals of a control voltage source, and said first and second electrodes of said transistor being in the output of said voltage-amplifying elementary circuit.

For a better understanding of the invention and to show how it may be carried into effect, the same will now be described by way of example with reference to the accompanying drawings, in which:

*Identification of the drawings*

Figure 14:
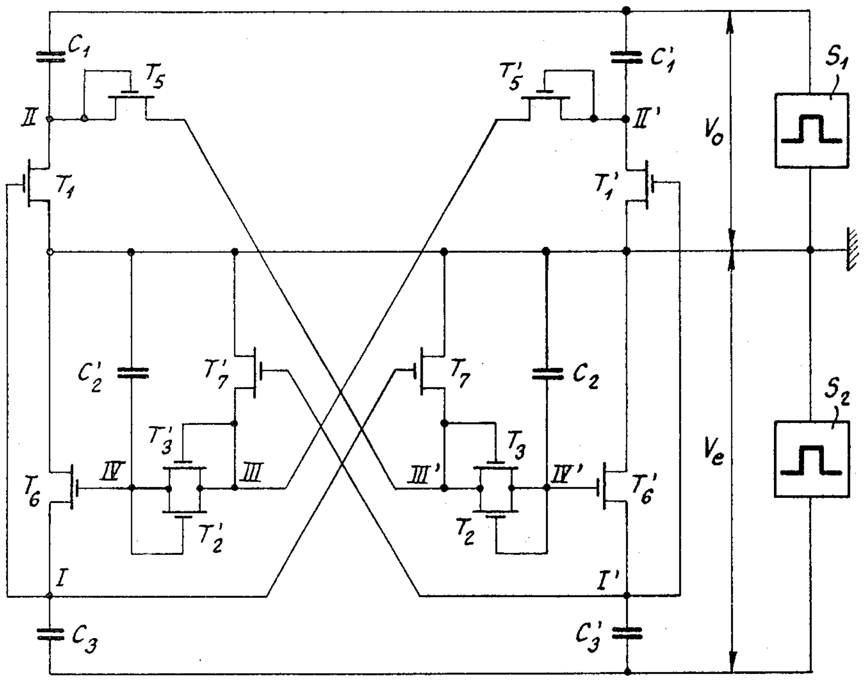
Figure 17:
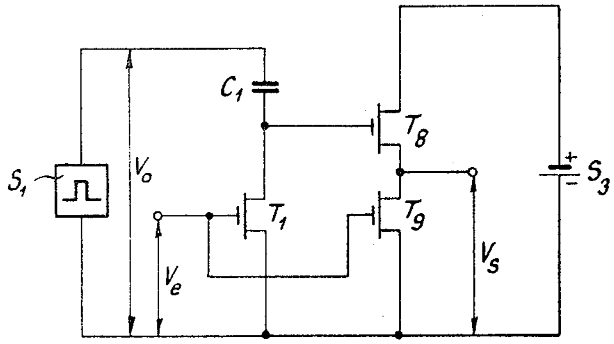

FIGURE 15 and FIGURES 16*a* to 16*h* show electrical characteristics of the FIGURE 14 embodiment; and FIGURE 17 is an electrical diagram of a fourth embodiment of the integrated circuit according to the invention.

*Disclosure of embodiments*

Figures 1, 3:
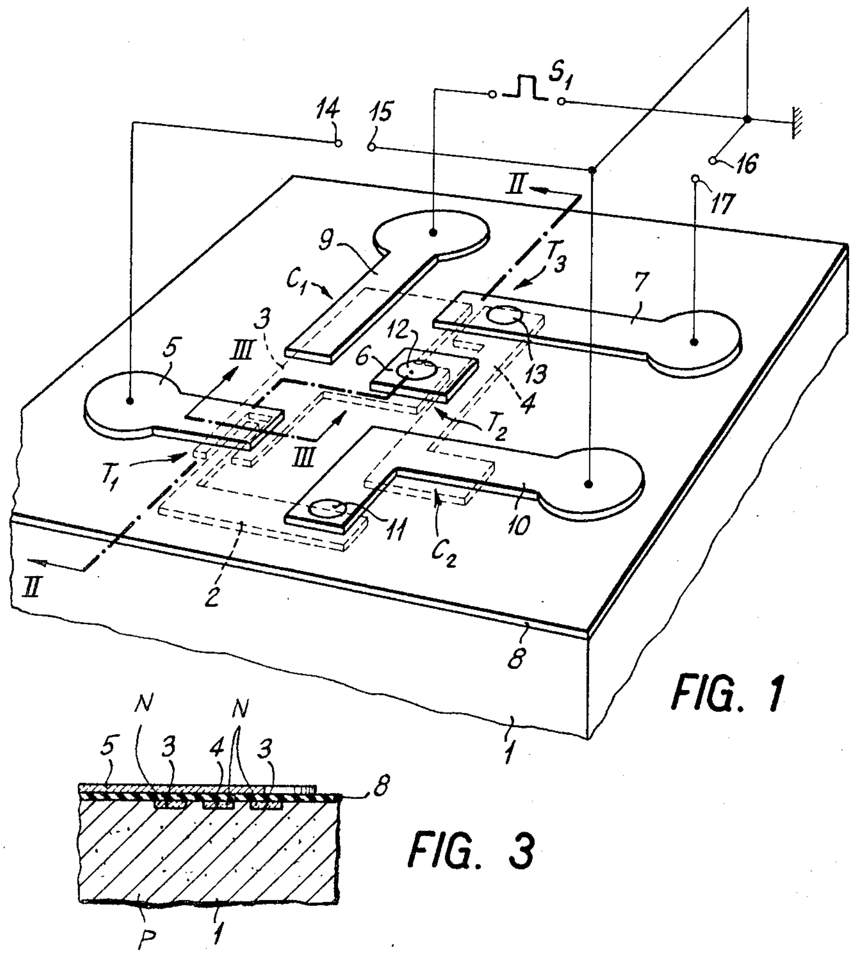
FIGURE 1 is a perspective view of a first embodiment of an integrated circuit according to the invention.
FIGURE 3 is a section along line III—III of FIGURE 1.
Figure 2:
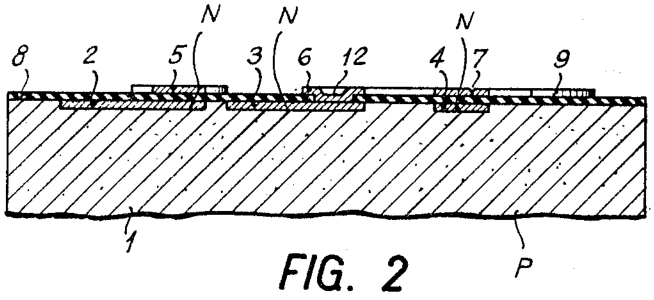
FIGURE 2 is a section along line II—II of FIGURE 1.

The integrated circuit shown in FIGURES 1, 2 and 3 comprises a body of semiconductive monocrystal 1, for example of P-type silicon. The monocrystal 1 is illustrated in FIGURE 1 without part of its thickness, which part has been removed to facilitate illustration on a common scale. On its upper face, the monocrystal 1 comprises three N-type monocrystalline zones 2, 3 and 4 obtained, for example, by a diffusion process. The geometric shape of these three zones 2, 3 and 4 is such that they can form the source and drain electrodes of three insulated gate field-effect transistors. Thus, zones 2 and 3 together with a first gate 5 form a first transistor $T_1$, and zones 3 and 4 form, together with a second gate 6, form a second transistor $T_2$ and, together with a third gate 7, a third transistor $T_3$. The insulation of gates 5, 6 and 7 of zones 2, 3 and 4 is provided by a thin layer 8, for example of silicon oxide. The circuit further comprises two electrodes 9 and 10 for connecting transistor $T_1$ to a periodic voltage supply source $S_1$. The electrode 9 is connected to transistor $T_1$ through the intermediary of a capacitor $C_1$ formed by electrode 9, the insulating layer 8 and the zone 3. The electrode 10 is connected to the transistor $T_1$ by the zone 2 with which it forms an ohmic contact 11. The electrode 10 is also connected to the transistor $T_2$ through the intermediary of a capacitor $C_2$ formed by electrode 10, the insulation 8 and the zone 4. The gates 6 and 7 of transistors $T_2$ and $T_3$ communicate with zones 3 and 4 respectively via ohmic contacts 12 and 13. Gate 5 and electrode 10 are respectively connected to input terminals 14 and 15, the latter being intended for connection to a control voltage source. Electrode 10 is moreover connected to one of the output terminals, e.g. terminal 16, the other output terminal 17 being connected to electrode 7. The crystal 1 is connected to ground from a contact not shown. It can also be negatively biased in relation to ground.

As will be observed, the described integrated circuit, i.e. a circuit formed of a single block a semiconductive material, which in this particular instance is a block of monocrystal 1.

Figure 4:
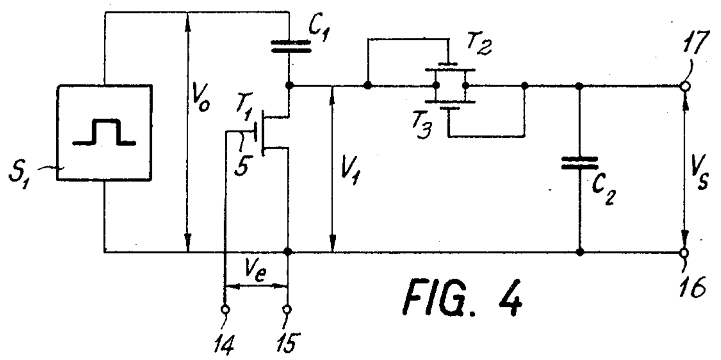
FIGURE 4 is an electrical diagram of the circuit illustrated in FIGURE 1.

FIGURE 4 is an electrical diagram of the integrated circuit shown in FIGURE 1. In this figure, the integrated circuit is shown to comprise an elementary circuit formed by the transistor $T_1$ series-connected with the capacitor $C_1$ and the voltage source $S_1$. The latter provides a periodic supply voltage $V_o$ in the form of unidirectional rectangular pulses. The gate 5 of transistor $T_1$ is connected to one of the input terminals 14 and 15, e.g. terminal 14, which terminals are intended for connection to a control voltage source $V_e$. The integrated circuit comprises moreover an upper harmonics filter which connectes the elementary circuit to the output terminals 16 and 17 and which is formed by transistors $T_2$ and $T_3$ and by capacitor $C_2$. Transistors $T_2$ and $T_3$ are connected in parallel and are mounted in opposition to form a two-pole arrangement so as to have characteristics similar to those of two oppositely mounted diodes.

Figure 9:
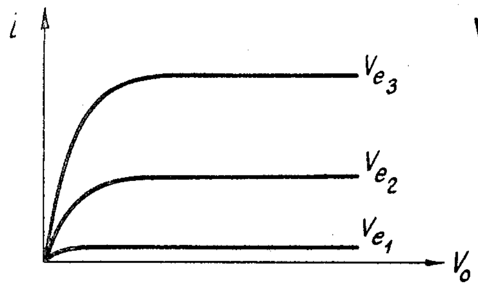
FIGURES 9 and 10 show two electrical characteristics of the transistor illustrated in FIGURES 7 and 8.
Figure 10:
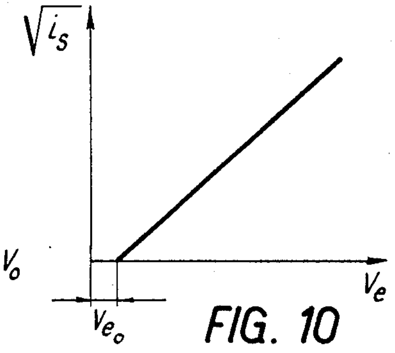

The transistors comprised by the described integrated circuit are insulated gate field-effect transistors. One such transistor is illustrated in FIGURES 7 and 8 and its operational characteristics are shown in FIGURES 9 and 10.

Figures 7, 8:
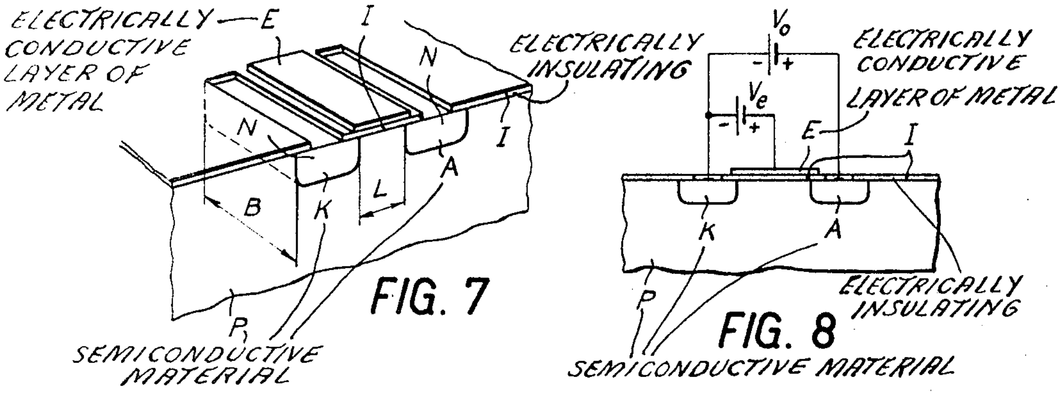
FIGURES 7 and 8 are respectively isometric and elevational views of an insulated gate field-effect transistor used in the circuit illustrated in FIGURE 1.

As will be observed, the transistor illustrated in FIGURES 7 and 8 comprises a drain A and a source K formed by two N-type semiconductive monocrystalline zones comprised by a P-type monocrystal. The gate E is formed by a metallic layer and is separated from the two electrodes A and K by an insulating layer I, hence the term "insulated gate." B and L respectively designate the width and the length of the channel, i.e. the portion of the monocrystal P lying between the two zones A and K.

If a direct voltage $V_o$ is applied across the source K and the drain A and a voltage $V_e$ is applied across the source K and the gate E (see FIGURE 8), there is formed as from a certain value $V_{e_0}$ (FIGURE 10) of the latter voltage, termed "threshold," a reversal zone beneath the insulating layer I giving rise to a current *i*. FIGURE 9 shows the dependence of current *i* on voltage $V_o$ for various values of voltage $V_e$. As will be observed, for each value of voltage $V_e$ the current *i* reaches saturation when voltage $V_o$ exceeds a certain value, in particular when $$V_o > V_e - V_{e_0}$$

The saturation current of a given transistor is determined by the following relationship:

$$I_s = K\frac{B}{L}(V_e - V_{e_0})^2$$

wherein K is a constant that depends on the capacitance of layer I and on the effective mobility of the charge carriers in the reversal zone being influenced.

FIGURE 10 shows the square root of the saturation current $i_s$ in relation to the control voltage $V_e$.

An examination of the integrated circuit illustrated in FIGURE 4 shows that it is a voltage amplifying stage and that the circuit formed by the transistor $T_1$, the capacitor $C_1$ and the source $S_1$ should be an elementary voltage amplifying circuit. However, this elementary circuit differs from known conventional circuits by the absence of resistors and by the nature of the supply voltage. It will now be shown under what conditions such a circuit is truly a voltage amplifying circuit. In the following it will be assumed that $V_{e0} = 0$.

For an input voltage $$V_e \leq \sqrt{\frac{2C_1V_o}{K'T}}$$

wherein T is the period of voltage $V_o$ and K′ is a constant $$K\frac{B}{L}$$

(see above), the mean value of voltage $V_1$ is $$V_{1m} = \frac{V_0}{2} - \frac{K'T}{8C_1} \cdot V_e^2$$

and for an input voltage $$V_e \geq \sqrt{\frac{2C_1V_o}{K'T}}$$

this mean value is $$V_{1m} = \frac{C_1V_0^2}{2K'TV_e^2}$$

Amplification $$\frac{dV_{1m}}{dV_e}$$

is at a maximum when $$V_e = \sqrt{\frac{2C_1V_o}{K'T}}$$

and its value is $$\frac{dV_{1m}}{dV_e}=\sqrt{\frac{K'TV_o}{8C_1}}$$

The reverse current of the N-P junction formed by zone 3, which constitutes both the drain of transistor $T_1$ and an electrode af capacitor $C_1$ (see FIGURES 1 and 4), must of course be at most equal to $$\frac{C_1V_0}{T}$$

For a junction having for example an area of about $2\cdot10^{-6}$ cm.$^2$ and in the case when a silicon crystal is being utilized, there is easily obtained for this reverse current a value of the order of $10^{-10}$ to $10^{-11}$ A. If it is supposed, that the area of the other electrode of capacitor $C_1$, which electrode is formed in this particular instance by a portion of electrode 9 (FIGURES 1 and 3), is $10^{-6}$ cm.$^2$, and that the thickness of the insulating layer 8, formed in this particular instance of silicon oxide (FIGURES 1 and 3), is 1000 A., the capacitor $C_1$ will have a capacitance of about 0.035 pf. On the basis of this latter value and that of the reverse current, and assuming that the supply voltage ($V_o$) is equal to 3 volts, the period T of this voltage can be at most equal to $10^{-3}$ seconds.

For the transistor $T_1$ (FIGURES 1, 7 and 8), a value of $10^{-6}$ $A/V^2$ can easily be obtained for the constant K'.

On the basis of the above values, the amplification $$\frac{dV_{1m}}{dV_e}\cong100$$

It should be noted that the maximum power consumption of this amplifier is of the order of $10^{-10}$ watts.

Figures 5, 6:
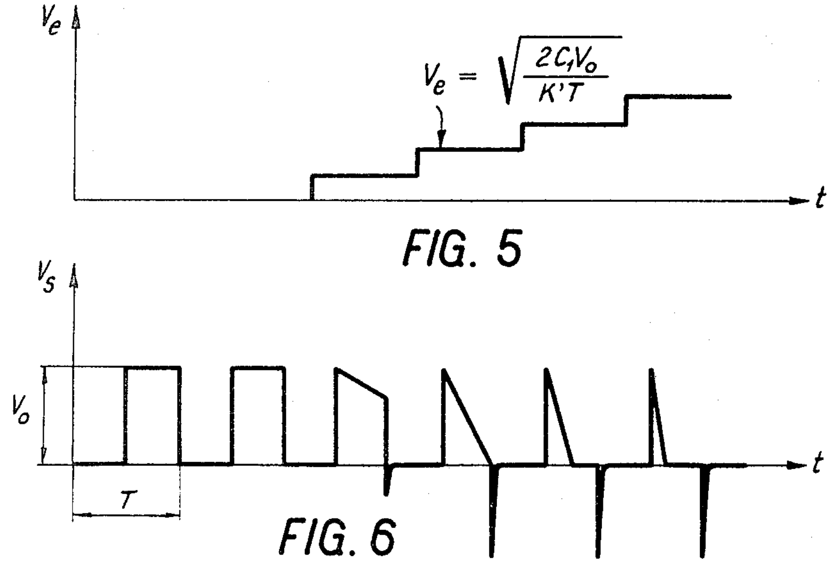
FIGURES 5 and 6 show two electrical characteristics of the circuit illustrated in FIGURE 1.

FIGURE 6 shows the variation in shape of the output voltage $V_1$ brought about by the variation in amplitude of the input voltage $V_e$, as shown in FIGURE 5. As may be seen when $V_e=0$, $V_1$ is a rectangular voltage equal to $V_o$. As $V_e$ increases, the shape of $V_1$ changes more and more to become a triangle of which the base decreases as $V_e$ increases.

Thus, the elementary circuit formed by transistor $T_1$, capacitor $C_1$ and source $S_1$ effectively is a voltage amplifying circuit. It will also be observed that it is relatively easy to produce such a circuit in the form of an integrated circuit, which is far from being the case with a circuit having resistors and expected to amplify to a corresponding extent with an equally low power consumption.

It should be noted that the periodic supply voltage, which in the present instance is a voltage consisting of a train of unidirectional pulses, can alternatively be a voltage consisting of a train of bidirectional pulses or a sinusoidal voltage.

Thus, by designing an elementary voltage circuit with only one transistor and one capacitor, i.e. with neither resistors nor complementary transistors, the problem of integration is considerably simplified. Amplification is made possible by the use of a periodic supply voltage.

In order to manufacture an integrated circuit as described and illustrated, the nowadays well known photolithographic method may, for example, be resorted to. This method is based on the fact that certain substances can be rendered insoluble by prior exposure to ultra-violet light. In order to diffuse zones 2, 3 and 4 into the monocrystal 1, the surface of the latter is first oxidized, the oxidized surface is then covered with a photo-sensitive substance, whereupon the latter is exposed to ultra-violet light through a photo-negative masking the areas where the zones 2, 3 and 4 are to be produced. The oxide layer covering these areas is then dissolved in order to proceed with the diffusion operation. Once this operation has been completed, the entire surface of the monocrystal is again oxidized and, as explained above, the oxide layer is removed from the areas where contacts 11, 12 and 13 are to be located. In order to produce these and the various electrodes, a metallic layer is deposited over the entire surface, e.g. a layer of aluminium, whereupon it is removed, by the photolithographic method also, from those areas where it is not required. The fact that one of the electrodes of a capacitor is formed by the drain of a transistor makes it necessary for only one metallic layer to be deposited, thereby considerably simplifying manufacture.

Figure 11:
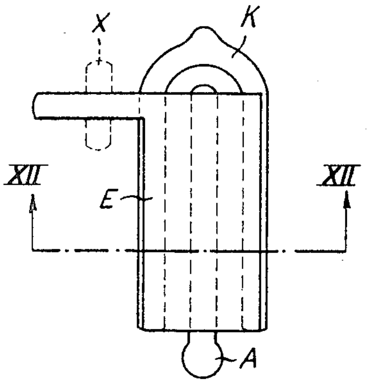
FIGURE 11 shows another constructional form of insulated gate field-effect transistor suitable for use in an integrated circuit according to the invention.
Figure 12:
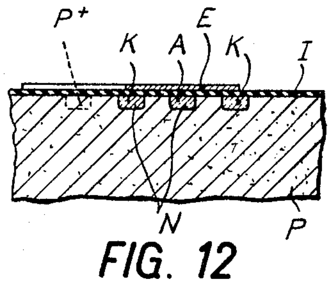
FIGURE 12 is a section along line XII—XII of FIGURE 11.

It should be noted that, in integrated circuits, it is often very important to be able to reduce as much as possible interaction between the different components or elements. Thus, for example, coupling of the two insulated gate field-effect transistor zones subjected to a periodic voltage, with other zones of the integrated circuit, can be greatly reduced by having the zones of the same transistor extend one within the other, as shown in FIGURES 11 and 12. Furthermore, in order to avoid the possible formation of a reversal zone beneath the connections of a gate, there may be diffused into the crystal, beneath such connections, a strongly doped zone having the same conductivity type as the crystal, e.g. zone X shown in FIGURE 11.

The integrated circuit shown diagrammatically in FIGURE 4 is a simple electronic circuit consisting of an elementary voltage amplifying circuit and of a low-pass filter, but the possibility of integrating such an elementary circut makes it of course possible to integrate any other more complex electronic circuit using this elementary circuit as a basic circuit.

Figure 13:
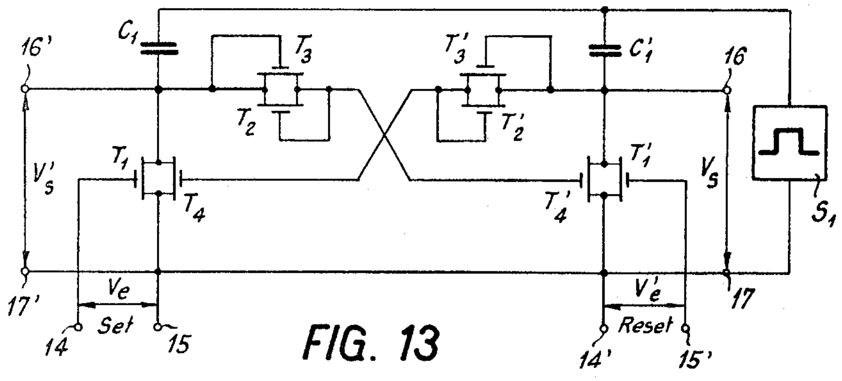
FIGURES 13 and 14 are electrical diagrams of second and third embodiments of the integrated circuit according to the invention.

FIGURE 13 shows the arrangement of a so-called "Set-Reset" flip-flop circuit comprising two elementary voltage-amplifying circuits $T_1$, $C_1$ and $T'_1$, $C'_1$ supplied by the source $S_1$. The output of circuit $T_1$, $C_1$ is connected to an output terminal 16' and, through the intermediary of two oppositely mounted transistors $T_2$ and $T_3$ connected to form a two-pole arrangement, to the gate of a transistor $T'_4$ parallel-connected to the transistor $T'_1$ of the other amplifying elementary circuit. Similarly, the output of circuit $T'_1$, $C'_1$ is connected to an output terminal 16 and, through the intermediary of two oppositely mounted transistors $T'_2$ and $T'_3$ connected to form a two-pole arrangement, to the gate of a transistor $T_4$ parallel-connected to the transistor $T_1$ of the first amplifying elementary circuit. The two pairs of oppositely mounted transistors $T_2$ and $T_3$ and $T'_2$ and $T'_3$, together with the input capacitances of transistors $T'_4$ and $T_4$, each form a low-pass filter.

Depending on whether the control voltage is applied to the "Set" or "Reset" input, i.e. depending on whether voltage $V_e$ or $V'_e$ is being applied, the circuit is set in one or other of its stable states.

The above described flip-flop circuit can easily be integrated since it only has transistors of the same conductivity type and capacitors.

FIGURE 14 shows the arrangement of one stage of a frequency dividing circuit comprising two elementary voltage amplifying circuits $T_1$, $C_1$ and $T'_1$, $C'_1$. Point II of circuit $T_1$, $C_1$ is connected through the intermediary of a transistor $T_5$, connected to form a two-pole arrangement, and of a filter formed by $T_2$, $T_3$ and $C_2$ to the gate of a transistor $T'_6$, and is grounded through the intermediary of a transistor $T_7$. Similarly, point II' of circuit $T'_1$, $C'_1$ is connected, through the intermediary of a transistor $T'_5$ and of a low-pass filter formed by $T'_2$, $T'_3$ and $C'_2$, to the gate of a transistor $T_6$, and is grounded through the intermediary of a transistor $T'_7$. The supply voltage $V_o$ is provided by the source $S_1$ and the control voltage $V_e$ by a second source $S_2$, through the intermediary of capacitors $C_3$ and $C'_3$.

The above-described dividing circuit operates as follows:

The circuit must be so dimensioned that the ratio $K'/C$ of the units formed by transistor $T_6$ and capacitor $C_3$ and by transistor $T'_6$ and capacitor $C'_3$ be substantially higher than the corresponding ratio of the units formed by $T_1$ and $C_1$, and by $T'_1$ and $C'_1$, respectively.

The operation will be described starting from the moment when capacitor $C_2$ is in a charged state and capacitor $C'_2$ is in a discharged state. Transistor $T'_6$ is in a conductive state and transistor $T_6$ is blocked. It should be noted that in this particular instance voltages $V_e$ and $V_o$, supplied respectively by sources $S_1$ and $S_2$, are identical.

An impulse of voltage $V_e$, and consequently of $V_o$, gives rise to a very short voltage impulse at point I' thereby rendering transistor $T'_1$ conductive for only such a short time that the capacitor $C'_1$ practically receives no charge at all, so that voltage $V_o$ appears at point II'. At the same time, voltage $V_e$ appears at point I, since transistor $T_6$ is still blocked, so that transistor $T_1$ is rendered conductive and capacitor $C_1$ is charged. The voltage at point II thus becomes nil. Moreover, transistor $T_7$ is also rendered conductive by the voltage that has appeared at point I, thereby causing a relatively slow discharge of capacitor $C_2$ through transistor $T_2$. In the meantime, capacitor $C'_2$ is being charged, relatively slowly, through transistors $T'_5$ and $T'_3$, by the voltage at point II'.

By virtue of transistor $T'_5$, which operates in a manner similar to that of a diode, the capacitor $C'_2$ remains charged until the positive front of the next impulse of voltage $V_e$ returns the circuit, as described above, to its starting condition.

Figures 15, 16A, 16B, 16C, 16D, 16E, 16F, 16G, 16H:
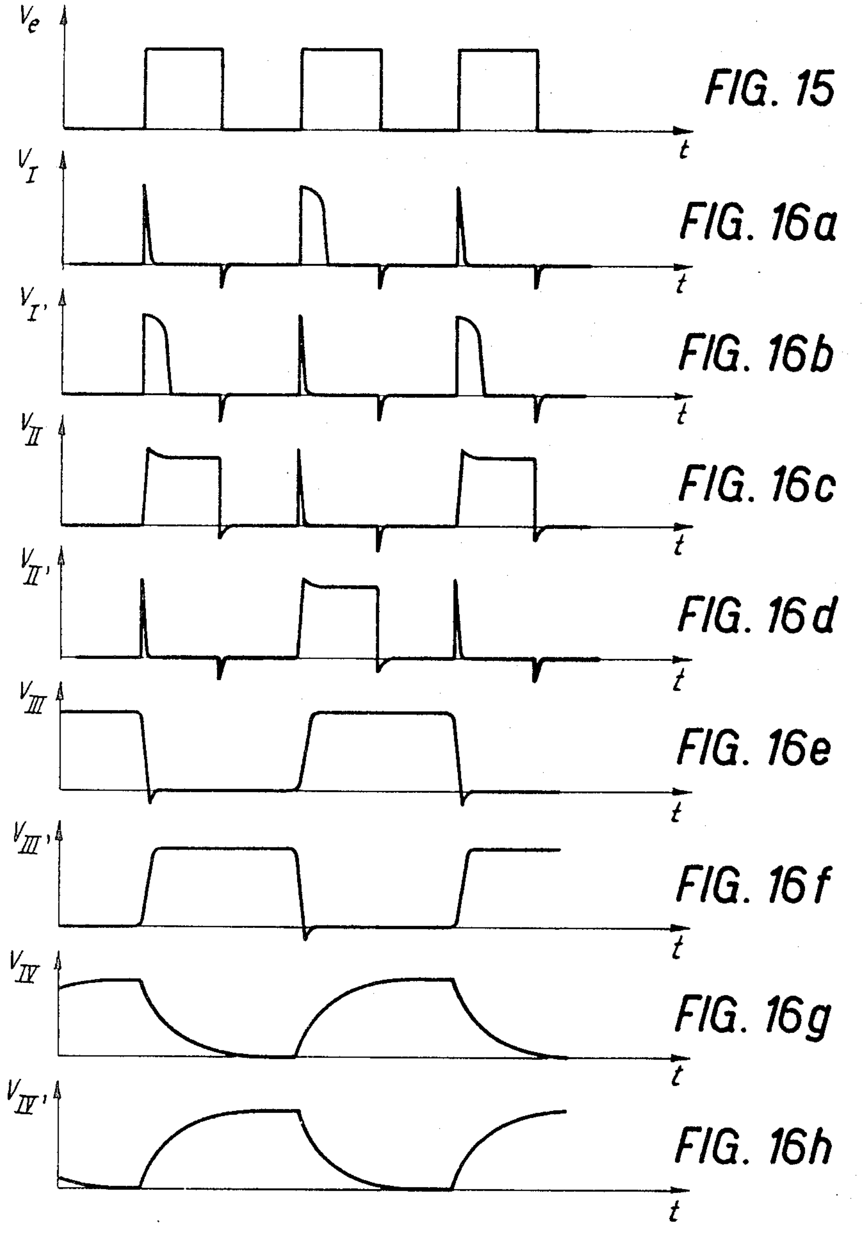

FIGURES 16*a* to 16*h* show the voltage at the different points of the above-described circuit in relation to the control voltage $V_e$ represented in FIGURE 15. It will thus be observed that the output voltage frequency (FIGURES 16*e* to 16*h*) is half as great as that of the input frequency (FIGURE 15). The arrangement thus effectively constitutes one stage of a frequency divider.

In the case of the above-described dividing circuit, the control voltage and the supply voltage, which are identical, are provided by two independent sources $S_1$ and $S_2$. Needless to say that only one source need be resorted to. Obviously such a circuit can also operate when both voltages are sinusoidal voltages or voltages consisting of pulses of other shapes. Because of the transistors $T_5$ and $T'_5$, the frequency of the control voltage $V_e$ may be different although lower than that of the supply voltage $V_o$. Needless to say that in this case, this, of course, would, in such a case, amount to dividing the voltage $V_e$.

In the integrated circuit shown in FIGURE 17, the outlet of the elementary circuit is connected to the gate of a second transistor $T_8$ which is itself series-connected with a third transistor $T_9$ of which the gate is connected to the elementary circuit input. A D.C. voltage source $S_3$ supplies transistors $T_8$ and $T_9$.

As will be realized, this arrangement in fact involves two amplifying circuits controlled by the same input voltage $V_e$. The first of these circuits is the circuit formed by transistor $T_1$, capacitor $C_1$ and source $S_1$, whereas the second circuit is formed by two transistors $T_8$ and $T_9$ and by source $S_3$, the first transistor $T_8$ of this second circuit, representing the load, being controlled by the output voltage of the first circuit.

It will readily be understood that, in the absence of an input voltage $V_e$, the transistors $T_1$ and $T_9$ will be blocked and the transistor $T_8$ will be conductive, thereby obtaining output voltage $V_s$. In the presence of a sufficient voltage $V_e$, voltage $V_s$ will be nil, since transistor $T_8$ is blocked and transistors $T_1$ and $T_9$ are conductive.

Consequently, in this embodiment circuit $C_1T_1$ amplifies voltage and circuit $T_8$, $T_9$ amplifies power.

It should be noted that the D.C. voltage source $S_3$ may be replaced by a periodic voltage source, for example by source $S_1$.

The above-described voltage and power amplifying integrated circuit can be made up of components which consist only of transistors of the same conductivity type and of capacitors and can be used in more complex integrated circuits.

I claim:

1. An integrated electronic circuit consisting essentially of insulated-gate field-effect transistors of the same conductivity type and of capacitors electrically connected in a predetermined circuit arrangement, each of said transistors having first and second electrodes in a conduction path, and a gate electrode for controlling the conductivity of the path, said electrodes being formed on one face of a body of semiconductive material and said first and second electrodes of the transistor having rectifying junctions with said body, and said capacitors each having first and second electrodes and a dielectric between said first and second electrodes thereof, said capacitor electrodes and dielectric also being formed on said one face of said body, there being a voltage-amplifying elementary circuit formed having therein a said transistor and a said capacitor, said transistor and said capacitor being connected in series by their first electrodes, their second electrodes being adapted to be connected to the terminals of a periodic supply voltage source, said gate electrode and second electrode of said transistor providing the input of said voltage-amplifying elementary circuit and being adapted to be connected to the terminals of a control voltage source, and said first and second electrodes of said transistor being in the output of said voltage-amplifying elementary circuit.

2. An integrated electronic circuit according to claim 1, wherein said body is made of silicon of a conductivity type and said transistors are MOS field-effect transistors having said first and second electrodes form drain and source electrodes of opposite conductivity type than that of said body in said one face of said body, the gate electrode of each of said transistors being formed by a metallic layer on an insulation layer of silicon oxide on said one face of said body and on said drain and source electrodes, and said first and second electrodes of said transistors having ohmic contacts leading through said silicon oxide layer.

3. An integrated electronic circuit according to claim 2, wherein an extension of said metallic gate electrode layer of a corresponding said transistor forms an electrical lead integral with said insulation layer of silicon oxide, and said body in said one face beneath said electrical lead is regionally doped to be more strongly of said body conductivity type.

4. An integrated electronic circuit according to claim 2, wherein said capacitors are MOS capacitors, one electrode of each of said capacitors being formed by a semiconductive zone of the opposite conductivity type than that of said body in said one face of said body, the dielectric of each of said capacitors being formed by said layer of silicon oxide on said semiconductive zone of the capacitor, and the other electrode of each of said capacitors being formed by a metallic layer on said oxide layer.

5. An integrated electronic circuit according to claim 2, wherein said first and second transistor electrodes of a corresponding said transistor are spaced apart one extending within the other.

6. An integrated electronic circuit according to claim 1, wherein said body is made of silicon of a conductivity type and said voltage-amplifying elementary circuit is characterized by said transistor therein being a MOS field-effect transistor and by said capacitor therein being a MOS capacitor, there being a semiconductive zone of opposite conductivity type to that of said body in said one face of said body, said semiconductive zone including one of said electrodes of said MOS capacitor and one of said electrodes of said MOS field-effect transistor other than said gate electrode thereof, and said gate electrode of said MOS field-effect transistor and the other electrode of said MOS capacitor being on an oxide layer forming the dielectric of said MOS capacitor and insulating said gate electrode from the other electrodes of said MOS field-effect transistor.

7. An integrated electronic circuit according to claim 1, further comprising a low-pass filter connected to the output of said voltage-amplifying elementary circuit, said low-pass filter including an additional pair of said transistors and an additional said capacitor, said further pair of transistors being connected to form a two-pole arrangement.

8. An integrated circuit according to claim 1 and characterized by being a voltage and power amplifying circuit wherein said transistor in said voltage-amplifying elementary circuit has said first electrode and said gate electrode thereof connected respectively to said gate electrode of a second said transistor and to said gate electrode of a third said transistor, said second electrode of said second transistor and said first electrode of said third transistor being interconnected in series, and said first electrode of said second transistor and said second electrode of said third transistor being adapted to be connected to the terminals of a direct voltage supply source.

9. An integrated electronic circuit according to claim 1 and characterized by being a bistable set-reset circuit having first and second inputs and first and second outputs, and comprising a first said voltage-amplifying elementary circuit having therein a first of said transistors and a first of said capacitors, said first transistor and said first capacitor being connected in series by their first electrodes, their second electrodes being adapted to be connected to the terminals of a periodic supply voltage source, said gate and second electrodes of said first transistor providing said first input and being adapted to be connected to the terminals of a control voltage source, and said first and second electrodes of said first transistor providing said first output; a second voltage-amplifying elementary circuit having therein a second said transistor and a second said capacitor, said second transistor and said second capacitor being connected in series by their said first electrodes, their said second electrodes being adapted to be connected to the terminals of said periodic supply voltage source, said gate and second electrodes of said second transistor providing said second input and being adapted to be connected to the terminals of a control voltage source, and said first and second electrodes of said second transistor providing said second output; a third said transistor connected in parallel with said first transistor; a fourth said transistor connected in parallel with said second transistor; a first two-pole arrangement including a fifth said transistor and a sixth said transistor mounted in opposition, one pole thereof being connected to said first electrode of said first transistor and the other pole thereof being connected to said gate electrode of said fourth transistor; and a second two-pole arrangement including a seventh said transistor and eighth said transistor mounted in opposition, one pole thereof being connected to said first electrode of said second transistor and the other pole thereof being connected to said gate electrode of said third transistor.

References Cited

UNITED STATES PATENTS

| | | | |
|---|---|---|---|
| 3,070,762 | 12/1962 | Evans | 333—70 |
| 3,102,230 | 8/1963 | Dawon Kahng | 323—94 |
| 3,137,796 | 6/1964 | Luscher | 307—88.5 |
| 3,199,002 | 8/1965 | Martin | 317—234 |
| 3,233,123 | 2/1966 | Heiman | 307—88.5 |
| 3,268,827 | 8/1966 | Carlson et al. | 330—18 |
| 3,267,295 | 8/1966 | Zuk | 307—88.5 |
| 3,158,757 | 11/1964 | Rywak | 307—88.5 |

JOHN W. HUCKERT, *Primary Examiner.*

R. F. SANDLER, *Assistant Examiner.*

UNITED STATES PATENT OFFICE
CERTIFICATE OF CORRECTION

Patent No. 3,383,569 May 14, 1968

Jakob Lüscher

It is certified that error appears in the above identified patent and that said Letters Patent are hereby corrected as shown below:

Column 2, line 8, "impossible" should read -- possible --. Column 4, lines 50 and 51, that portion of the formula reading "$V_c$" should read -- $V_e$ --; lines 58 and 59, that portion of the formula reading "$V_c^2$" should read -- $V_e^2$ --; lines 65 and 66, that portion of the formula reading "$V_c^2$" should read -- $V_e^2$ --.

Signed and sealed this 21st day of April 1970.

(SEAL)
Attest:

Edward M. Fletcher, Jr.
Attesting Officer

WILLIAM E. SCHUYLER, JR.
Commissioner of Patents